Nov. 21, 1950                J. M. UNK                2,530,795
DEVICE FOR ARRESTING A SHAFT
Filed Sept. 28, 1948
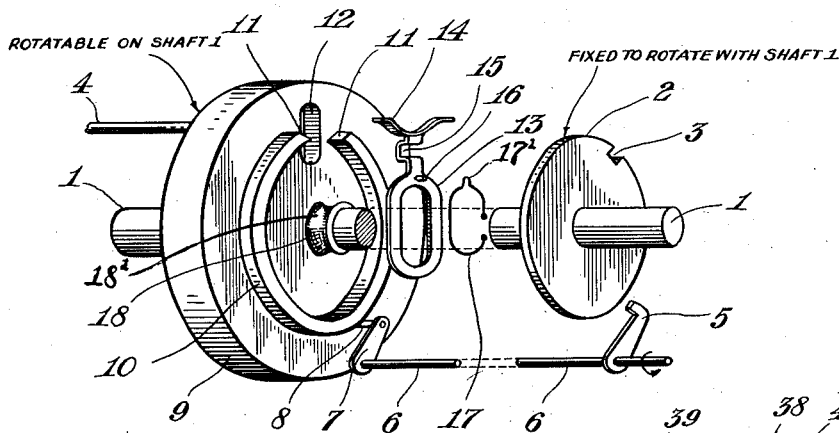
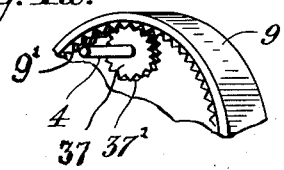
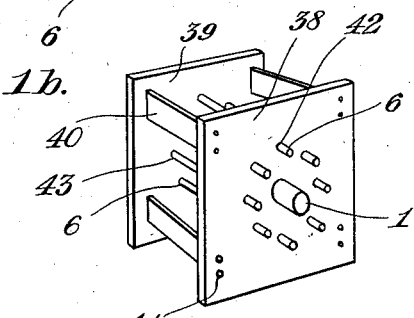
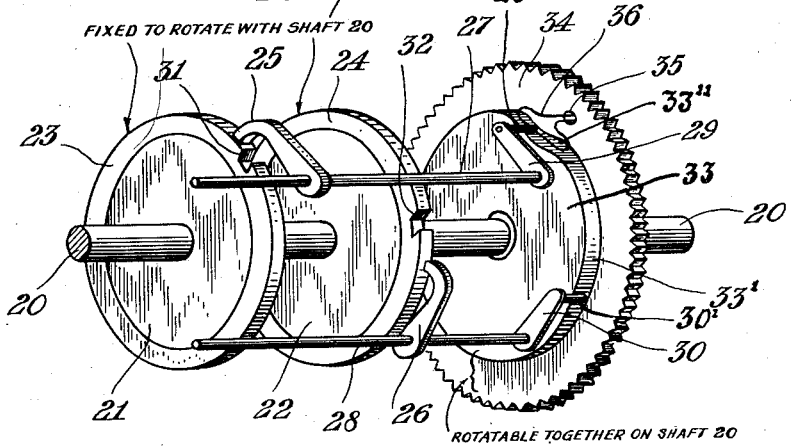
JACOB MARINUS UNK
*INVENTOR.*
BY
ATTORNEYS Patented Nov. 21, 1950

2,530,795

UNITED STATES PATENT OFFICE 2,530,795

DEVICE FOR ARRESTING A SHAFT

Jacob Marinus Unk, Eindhoven, Netherlands, assignor to Hartford National Bank and Trust Company, Hartford, Conn., as trustee Application September 28, 1948, Serial No. 51,605
In the Netherlands October 4, 1947

6 Claims. (Cl. 74—10.2)

This invention relates to a device in which a rotary shaft, to which a number of arresting members are secured, is adapted to be arrested by any one of a corresponding number of movable pawls arranged around the shaft. More particularly, the device comprises a selecting member (pawl selector) which is movable about the shaft and is adapted to occupy different positions (selecting positions) in each of which another pawl is brought into a position in which it is adapted to cooperate with one of the arresting members.

Such devices are frequently used for arresting a shaft in a number of predetermined positions; the shaft having connected to it a tuning element of a radio-transmitting or receiving apparatus. In a known device, the pawls are provided in the wall of a stationary cylindrical housing surrounding the shaft, a resilient member of the pawl selector being adapted to move around the outer wall of this housing. Upon rotation, the resilient member urges successively each pawl in the direction toward the shaft with the result that the selected pawl is compelled to co-operate with a recessed pawl ring connected to the shaft. If the selecting member occupies a position in which the pawl is urged towards the shaft, the recess in the pawl ring, upon subsequent rotation of the shaft, will arrive under this pawl at a given moment so that it will be engaged by it. In this manner the shaft is arrested in a position entirely determined by the location of that pawl which is urged towards the shaft by the pawl selector, and by the position of the recess of the pawl ring with respect to the shaft. If the shaft is desired to occupy a different position, the selecting member is first turned in order to bring another pawl into the operative position, so that the resilient portion of the pawl selector releases the arresting pawl and reaches the newly chosen pawl which is required to arrest the shaft in the new position to be occupied. Each pawl is subject to the counter force of a spring by which the pawl is normally kept lifted. On termination of the pressure exerted by the pawl selector on the arresting pawl, it is contemplated that the latter should be lifted by the said counter force to enable the shaft to be turned into its new position. It happens, however, that the pressure exerted on the pawl in the arrested position by the edge of the recess may be such that the spring pressure steadily acting on the pawl does not lift the pawl after turning the selecting member.

The invention has for its object to provide a construction in which this disadvantage is avoided and at the same time further advantages are obtained.

According to the invention the construction of the selecting member is such that on moving from a position in which a pawl cooperates with the shaft, this pawl is lifted in constrained manner by the selecting member, thus disengaging the coupling between shaft and pawl, whilst the selecting member keeps the pawl lifted as long as the selecting member is not anew given the position which it occupied before the lifting of the pawl. In this manner the contingency is avoided that, starting from a selecting position wherein the pawl as determined by this particular position arrests the shaft of the device, and moving towards a position of the selecting member in which another pawl is to be made to co-operate with the shaft, the blocking of this shaft by the operative pawl is maintained. Consequently, rotation of the shaft towards the new position to be occupied is not prevented.

In a suitable form of construction of the device according to the invention, the selecting member is furnished with a racer way, which extends around the shaft and with which co-operate a number of lugs that are each separately connected to a pawl, this racer way having such a form in a tangential direction that in any selecting position of the selecting member all pawls but one are prevented from moving to the operative position by abutment of the lugs connected to these pawls on the racer way of the selecting member, whilst on turning the selecting member out of a selecting position the lug connected to the pawl which is operative in this position is radially shifted in a constrained manner by the racer way, thus terminating the co-operation between the pawl in question and the arresting member on the shaft to be arrested, which is associated with this pawl.

In a further suitable form of construction the racer way of the selecting member extends substantially in a circular-concentrical manner about the shaft, this circular form being interrupted at one point. In this case solely the pawl, of which the lug connected thereto extends above this interruption in the racer way, is adapted to move so as to cooperate with the associated arresting element on the shaft. This movement of the pawl may originate from a spring co-operating with the pawl or the lug, such a spring being associated with each pawl or lug. It is, however, more advantageous to provide the selecting member with a movable part which is guided in a radial direction and by means of a spring connected to the selecting member is subjected to a radial force and which part, on a level with the interruption of the circular form of the racer way, has a guide surface which in any selecting position of the selecting member exerts a radial force on the lug which is connected to the operative pawl determined by this position, as a result of which this pawl is pressed on the associated arresting element on the shaft. In this manner it is ensured that each pawl need not be provided with a spring.

In another suitable construction of the device the pressure exerted on the lug of the pawl chosen is obtained by means of a wire- or band-shaped spring which is provided on the selecting member and of which the central part extends in a tangential direction above the interruption in the circular racer way.

In order that the invention may be clearly understood and readily carried into effect, it will now be described more fully with reference to the accompanying drawings, given by way of example, in which Figure 1 is a partially exploded perspective view of one form of construction of a device according to the invention. The housing for the device is removed and only one pawl and cooperating disc assembly is shown in order not to obscure the disclosure.

Figure 1a is a fragmentary rear perspective view of the selecting member of Figure 1 to show the driving means therefor.

Figure 1b is a perspective view of the device shown in Figure 1, but on a reduced scale, and with the housing and all the pawls in place to show the relationship therebetween.

Figure 2 is a perspective view of another form of construction of a device according to the invention. Here again the housing is removed and only two pawl and disc assemblies are shown for greater clarity.

In the device shown in Fig. 1 the reference numeral 1 denotes the shaft which is adapted to be arrested in different predetermined positions. Around this shaft 1 a number of rotary shafts, for instance eight or twelve, are arranged in a housing or cage (as shown in Figure 1b) comprising a pair of plate members 38 and 39 fastened in parallel relationship by means of four elongated connecting members 40 attached at their ends to the aforesaid plates 38 and 39, respectively, by conventional screw means 41. The plates 38 and 39 have aligned apertures 42 and 43 therein, respectively, so spaced in relation to each other and shaft 1 that the shafts 6 supported therein are parallel with the shaft 1 and are approximately equally spaced from each other and from the shaft 1. Each of these shafts has connected to it a pawl 5 which is adapted to co-operate with the recess 3 in the edge of one of a number of discs 2 secured one behind the other to the shaft 1. In Figure 1 only one of these shafts, namely the shaft 6, is represented and of the discs secured to the shaft 1 only that disc 2 is represented with which the pawl 5 carried by the represented shaft 6 is adapted to co-operate.

The recess 3 is provided at the edge of the disc 2 as mentioned hereinbefore. The pawl 5, has an end thereof which is adapted to co-operate with the recess 3 of the disc 2. This shaft 8 has also secured to it an arm 7 carrying at its end a pin 8. In the illustrated position co-operation between the pawl 5 and the edge of the disc 2 is prevented since the pin 8 rests on the outer surface of the annular elevation 10 of the selecting member 9 which is freely rotatable about the shaft 1. The annular rim 10 is interrupted at one point and the ends 11 of the rim are bevelled. Where the elevation 10 is interrupted the selecting member 9 has a slot 12 which extends in a radial direction. In this slot fits the bent neck 15 of the member 13 which for the sake of clarity is slightly moved to the right in Fig. 1, but in the assembled device rests on the selecting member 9. The member 13 consists of a part freely surrounding the shaft 1 and being connected, through the aforesaid bent neck 15, to a slightly V-shaped guide surface 14 which extends in a tangential direction. The part 13 is provided with a pin 16 which extends in the direction of the shaft 1 and about which a narrowed loop 17' of the curved wire spring 17 is laid, whereas the opposite part of this spring rests in a groove 18 of collar 18' on the selecting member 9. Consequently the spring 17 draws the guide surface 14 towards the shaft 1 and the part 13 is guided, since the neck 15 is adapted to move only in the direction of the slot 12. Driving means for selecting member 9 are preferably provided. To this end, the selecting member 9, as best seen in Figure 1a, may be in the form of a rearwardly flanged disc having gear teeth 9' on the internal periphery thereof which mesh with gear teeth 37' on a driving gear wheel 37 mounted on a rotatable shaft 4.

To explain the operation of the device it is supposed that the shaft 1 is desired to be arrested by means of the pawl 5 on the shaft 6. To this end the selecting member 9 is turned about the shaft 1 by means of gear wheel 37 until the pin 8 rests no longer on the outer racer way or periphery of the annular rim 10 but engages the interruption of this rim defined between beveled edges 11. In this case the selecting member 9 occupies the selecting position for bringing the pawl 5 into the operative position, since in this position the surface 14 rests on the pin 8 with the result that the arm 7 and consequently the shaft 6 and the pawl 5 are rotated to such a degree that the end of the pawl engages the edge of disc 2 and is maintained thereon. In this manner the pawl 5 is brought into its operative position, and upon rotation of the shaft 1 and consequently of the disc 2 the recess 3 at the edge of this disc is brought under the end of the pawl 5 which engages this recess 3 and consequently prevents any further movement of the shaft 1.

The position now occupied by the shaft 1 is entirely determined by the pawl chosen, in this instance pawl 5, and the location of the recess 3 in the disc 2 on the shaft 1, which co-operates with this pawl 5. The location of the recess 3 is adjustable beforehand since, for instance in a known manner, the different recessed discs are mounted on the shaft 1 with the interposition of discs which are not rotatable about the shaft, the set of discs thus obtained being so compressed as to be detachable in an axial direction. On removing this pressure each recessed disc is separately movable with respect to the shaft 1.

When it is desired to pass over from the position, wherein the pawl 5 arrests the shaft 1, to another position of this shaft 1, the selecting member 9 is first of all turned. In this case the pin 8 is urged out of the position occupied by means of one of the bevelled edges 11 of the annular rim 10, and subsequently compelled to follow the outer surface of this rim. The running of the pin 8 on one of the bevelled edges 11 causes the shaft 6 to be rotated and the pawl 5 lifted out of the recess 3. This pawl can no longer prevent rotation of the shaft 1 as long as the selecting member 9 is not again given the position in which the pin 8 engages the interruption of the rim 10 i. e. as long as the pawl 5 is not chosen again.

What has been said above applies to any of the other pawls arranged about the shaft 1 and the shafts carrying these pawls, each of which is likewise equipped with an arm and pin co-operating with the annular rim 10. In each of the selecting positions of the selecting member 9, one of the pins is located above or in the interruption of the rim 10, whereas the others rest on the outer surface thereof.

Figure 2 represents a device similar to that shown in Figure 1, but the construction of the selecting member is a little different. Of the arresting elements on the shaft 20 to be arrested and the pawl-carrying shafts arranged about this shaft only two are represented. Each such arresting element comprises a disc 21 or 22 provided on the shaft 20 and carrying a ring 23 or 24, respectively, of which the edge has a recess 31 or 32, respectively. In this case also the discs and rings are mechanically mounted on the shaft 20 by axial compressive force.

The selecting member 34 rotatable on the shaft 20 has an elevation 33 which extends in an axial direction and of which the surface 33' extending around the shaft 20 constitutes the guide surface for the pins 29' or 30' secured to the ends of the arms 29 or 30, respectively, with which each of the pawl-carrying shafts 27 or 28 arranged around the shaft 20 is furnished. The surface 33' extends approximately circularly around the shaft 20 but has a limited depression 33". Similarly to the device shown in Figure 1, all pawls of which the pins of the associated arms rest on the circular part 33' of this surface of the selecting member 34, are lifted in a constrained manner, and only that pawl of which the pin is located in or above the depression 33" of the surface 33' is adapted to co-operate with an arresting element 21 or 22 about the shaft 20. In Figure 2 the pin 29' of the arm 29 is urged towards the shaft 20 by a spring 36 and the interruption 33" of the circular form of the surface 33' is located below this pin. As a result thereof the shaft 27 is rotated until the pawl 25 on this shaft co-operates with the outer surface of the ring 23 with the result that upon rotation of the shaft 20 this pawl arrests the shaft 20 by engaging the recess 31. The spring 36 consists of a doubly bent wire, of which the ends are fastened in the aperture 35 provided in the selecting member 34 above the depression 33" of the surface 33'. The central part of this wire 36 extends substantially tangentially and exerts a pressure, in the direction of the shaft, on the particular pin which is caused to be located above the depression 33" of the surface 33'.

The pin 30' of the arm 30 secured to the shaft 28 to which the pawl 26 is fixed rests on the circular surface 33'. Consequently the pawl 26 is lifted and is maintained with its end at some distance from the outer surface of ring 24. Rotation of the selecting member 34 out of the represented selecting position results in that the shaft 27 is rotated, since the rising part of the surface 33' moves under the pin 29' on the arm 29 with the result that the pawl 25 is lifted. Consequently, the pawl 25 in question is lifted in a constrained manner and so remains until the selecting member 34 occupies again the selecting position in which this pawl 25 is made to co-operate with the ring 23. Consequently, on varying the selecting position of the selecting member 54, the pawl which has already caused the shaft 20 to be arrested, is unable to prevent rotation of this shaft towards the new position to be occupied.

What I claim is:

1. A shaft positioning mechanism comprising in combination, a rotatable shaft to be positioned, a plurality of stop-rings mounted on said shaft, a plurality of pivotally mounted pawls arranged in a circle around said shaft, each of said pawls being positioned to cooperate individually with a corresponding individual stop-ring, a selecting member rotatably mounted on said shaft, said selecting member having a camming surface thereon, a plurality of cam surface followers each mechanically linked to a corresponding pawl, each of said cam surface followers being positioned to ride on said camming surface, said camming surface having a contour constructed and arranged so that in a preselected position of the selector member, only one selected cam surface follower is caused to move to a position in which the pawl mechanically linked thereto is moved to a position of operative engagement with the corresponding stop-ring while the nonselected pawls are held in inoperative position with relation to their respective stop-rings due to their cam surface followers being in abutment with said camming surface.

2. A shaft positioning mechanism comprising in combination, a rotatable shaft to be positioned, a plurality of stop-rings mounted on said shaft, a plurality of pivotally mounted pawls arranged in a circle around said shaft, each of said pawls being positioned to cooperate individually with a corresponding individual stop-ring, a selecting member rotatably mounted on said shaft, said selecting member having a camming surface thereon, a plurality of cam surface followers each mechanically linked to a corresponding pawl, each of said cam surface followers being positioned to ride on said camming surface, said camming surface having a contour of a circular form substantially concentric with said shaft and having a discontinuity at one localized region thereof so that in a preselected position of said selector member, when only one selected cam surface follower is abutting the camming surface in the region of said section, the said cam surface follower is caused to move to a position in which the pawl mechanically linked thereto is moved to a position of operative engagement with the corresponding stop-ring while the nonselected pawls are held in inoperative position with relation to their respective stop-rings due to their cam surface followers being in abutment with said circular camming surface.

3. A shaft positioning mechanism comprising in combination, a rotatable shaft to be positioned, a plurality of stop-rings mounted on said shaft, a plurality of pivotally mounted pawls arranged in a circle around said shaft, each of said pawls being positioned to cooperate individually with a corresponding individual stop-ring, a selecting member rotatably mounted on said shaft, said selecting member having a camming surface thereon, a plurality of cam surface followers each mechanically linked to a corresponding pawl, each of said cam surface followers being positioned to ride on said camming surface, said camming surface comprising an annular projection extending from said selecting member with a segment removed, the ends of the annular projection being beveled, the contour of the camming surface being so constructed and arranged that in a preselected position of the selector member, when only one selected cam surface follower is in the region of the removed segment, the said cam surface follower is caused to move to a position in which the pawl mechanically linked thereto is moved to a position of operative engagement with the corresponding stop-ring while the nonselected pawls are held in inoperative position with relation to their respective stop-rings due to their cam surface followers being in abutment with the surface of said annular projection.

4. A shaft positioning mechanism comprising in combination, a rotatable shaft to be positioned, a plurality of stop-rings mounted on said shaft, a plurality of pivotally mounted pawls arranged in a circle around said shaft, each of said pawls being positioned to cooperate individually with a corresponding individual stop-ring, a selecting member rotatably mounted on said shaft, said selecting member having a camming surface thereon, a plurality of cam surface followers each mechanically linked to a corresponding pawl, each of said cam surface followers being positioned to ride on said camming surface, said camming surface having a continuous substantially circular contour except for a depression in one area thereof, the construction and arrangement being such that in a preselected position of said selector member, only one selected cam surface follower abuts said surface in the area of said depression and is caused to move to a position in which the pawl mechanically linked thereto is moved to a position of operative engagement with the corresponding stop-ring while the nonselected pawls are held in inoperative position with relation to their respective stop-rings due to their cam surface followers being in abutment with said circular camming surface.

5. A shaft positioning mechanism comprising in combination, a rotatable shaft to be positioned, a plurality of stop-rings mounted on said shaft, a plurality of pivotally mounted pawls arranged in a circle around said shaft, each of said pawls being positioned to cooperate individually with a corresponding individual stop-ring, a selecting member rotatably mounted on said shaft, said selecting member having a camming surface thereon, a plurality of cam surface followers each mechanically linked to a corresponding pawl, each of said cam surface followers being positioned to ride on said camming surface, said camming surface having a contour of a circular form substantially concentric with said shaft and having a discontinuity at one particular localized region thereof, and means for urging any cam surface follower which is in the region of said discontinuity radially into said discontinuity, so that in a preselected position of said selector member, when only one selected cam surface follower is in the region of said discontinuity, the said cam surface follower is caused to move to a position in which the pawl mechanically linked thereto is moved to a position of operative engagement with the corresponding stop-ring while the nonselected pawls are held in inoperative position with relation to their respective stop-rings due to their cam surface followers being in abutment with said camming surface.

6. A shaft positioning mechanism comprising in combination, a rotatable shaft to be positioned, a plurality of stop-rings mounted on said shaft, a plurality of pivotally mounted pawls arranged in a circle around said shaft, each of said pawls being positioned to cooperate individually with a corresponding individual stop-ring, a selecting member rotatably mounted on said shaft, said selecting member having a camming surface thereon, a plurality of cam surface followers each mechanically linked to a corresponding pawl, each of said cam surface followers being positioned to ride on said camming surface, said camming surface having a contour of a circular form substantially concentric with said shaft and having a discontinuity at one particular localized region thereof, and means including a spring element for urging any cam surface follower which is in the region of said discontinuity radially into said discontinuity, so that in a preselected position of said selector member, when only one selected cam surface follower is in the region of said discontinuity, the said cam surface follower is caused to move to a position in which the pawl mechanically linked thereto is moved to a position of operative engagement with the corresponding stop-ring while the nonselected pawls are held in inoperative position with relation to their respective stop-rings due to their cam surface followers being in abutment with said camming surface.

JACOB MARINUS UNK.

REFERENCES CITED

The following references are of record in the file of this patent:

UNITED STATES PATENTS

| Number | Name | Date |
|---|---|---|
| 2,285,414 | Collins | June 9, 1942 |
| 2,391,470 | May | Dec. 25, 1945 |